United States Patent
Khayrallah

(10) Patent No.: US 9,692,579 B2
(45) Date of Patent: Jun. 27, 2017

(54) MULTIPLE DESCRIPTION MEDIA BROADCAST AIDED BY A SECONDARY BASE STATION

(71) Applicant: Telefonaktiebolaget L M Ericsson (publ), Stockholm (SE)

(72) Inventor: Ali S. Khayrallah, Mountain View, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 380 days.

(21) Appl. No.: 14/451,711

(22) Filed: Aug. 5, 2014

(65) Prior Publication Data
US 2016/0043856 A1    Feb. 11, 2016

(51) Int. Cl.
| | | |
|---|---|---|
| H04L 5/00 | (2006.01) | |
| H04W 40/24 | (2009.01) | |
| H04W 72/04 | (2009.01) | |
| H04W 72/08 | (2009.01) | |
| H04L 1/00 | (2006.01) | |

(Continued)

(52) U.S. Cl.
CPC ....... H04L 5/0057 (2013.01); H04B 7/15528 (2013.01); H04L 1/0003 (2013.01); H04L 1/0009 (2013.01); H04N 19/39 (2014.11); H04W 40/244 (2013.01);
(Continued)

(58) Field of Classification Search
None
See application file for complete search history.

(56) References Cited

U.S. PATENT DOCUMENTS

| | | | | |
|---|---|---|---|---|
| 2007/0005675 A1* | 1/2007 | Ginzburg | ............. | H04L 69/324 708/523 |
| 2010/0128622 A1* | 5/2010 | Horiuchi | ............... | H04B 7/155 370/252 |

(Continued)

FOREIGN PATENT DOCUMENTS

CN    101820327 A    9/2010

OTHER PUBLICATIONS

"Successive Refinement Relaying Strategies in Coded Wireless Multicast Networks" by James Ho et al.; IEEE ICC 2011 proceedings, 2011

(Continued)

*Primary Examiner* — Shaq Taha
*Assistant Examiner* — Ronald H Davis
(74) *Attorney, Agent, or Firm* — Baker Botts, LLP

(57) ABSTRACT

According to some embodiments, a secondary network node detects a first data transmission of media content from a primary network node to a first wireless device. The first data transmission has a first data quality description D(n1) and a first transport format T(k1). The secondary network node selects a second data quality description D(n2') and a second transport format T(k2') for a second data transmission. The second data quality description D(n2') and second transport format T(k2') differ from the first data quality description D(1) and first transport format T(k1), respectively. The secondary network node transmits the second data transmission to a second wireless device according to the second data quality description D(n2') and the second transport format T(k2'). The second data transmission includes at least a portion of the media content.

25 Claims, 8 Drawing Sheets

(51) Int. Cl.
H04N 19/39 (2014.01)
H04B 7/155 (2006.01)

(52) U.S. Cl.
CPC ..... *H04W 72/0413* (2013.01); *H04W 72/085* (2013.01); *H04L 2001/0097* (2013.01)

(56) References Cited

U.S. PATENT DOCUMENTS

| | | | | |
|---|---|---|---|---|
| 2012/0026940 A1* | 2/2012 | Barbieri | ............... | H04L 5/0032 370/328 |
| 2013/0007814 A1* | 1/2013 | Cherian | ............... | H04L 65/605 725/62 |
| 2013/0301415 A1* | 11/2013 | Archer | ................. | H04W 28/08 370/235 |
| 2013/0301539 A1* | 11/2013 | Aguirre | ................ | H04W 16/00 370/329 |
| 2014/0137161 A1* | 5/2014 | Park | .................. | H04N 21/2221 725/62 |
| 2015/0082366 A1* | 3/2015 | French | .............. | H04N 21/6371 725/116 |
| 2015/0282191 A1* | 10/2015 | Luo | .................... | H04W 72/082 370/1 |

OTHER PUBLICATIONS

PCT Notification of Transmittal of the International Search Report and the Written Opinion of the International Searching Authority, or the Declaration for International application No. PCT/IB2015/055699, Dec. 9, 2015.

IEEE Journal of Selected Topics in Signal Processing, vol. 1, No. 2; "Cooperative Source and Channel Coding for Wireless Multimedia Communications" by Hoi Yin Shutoy et al., Aug. 2007.

* cited by examiner

130

MULTIPLE DESCRIPTION MEDIA BROADCAST AIDED BY A SECONDARY BASE STATION

TECHNICAL FIELD

Particular embodiments relate generally to wireless communications and more particularly to a multiple description media broadcast aided by a secondary base station.

BACKGROUND

Wireless networks are increasingly used in media delivery, in particular using some form of broadcast and streaming. Media consumption on wireless devices is growing at a very fast rate, with the advent of very capable smartphones and tablets that can deliver a good user experience. This puts a huge burden on wireless networks, which have to handle this media delivery as well as all other services ranging from voice to broadband data.

To deliver media to wireless devices, a wireless network uses a wireless channel. The quality of the wireless channel affects the ability of the network to reliably deliver the media. The quality of the wireless channel may vary depending on a number of factors, such as the distance of the wireless device to the base station, the current load on the base station, and so on. The network can adapt media streaming to the quality of the wireless channel by using multiple data quality descriptions of the same content and/or by adjusting the transport format used by the base station.

As an example, multiple data quality descriptions could be used to compress a small time section of a movie to various levels of quality. The highest data quality description would have no or very low distortion and would require the greatest number of bits. The lowest data quality description would have the most distortion and would require the fewest number of bits. Users in the best channel conditions may be able to receive the highest data quality description. Users in the worst channel conditions, typically at cell edge, may only be able to receive lower data quality descriptions, affecting their experience.

As mentioned above, the transport format used by the base station may also be adapted to the quality of the wireless channel. For example, the base station may select transport format characteristics, such as error control coding, modulation, multiple input/multiple output (MIMO) streams, etc., in order to target a certain block error rate (BLER) or other reliability level at the receiver. In general, a lower quality channel requires a more robust transport format that carries fewer information bits for the same resources (e.g., time, frequency, MIMO streams, and/or other resources).

Media delivery can overburden the network because network resources are limited and there is contention for the resources among different media content as well as among different services, such as voice, messaging, applications, etc., each with different quality of service requirements. Solutions are necessary to reduce the burden on the network associated with media delivery.

SUMMARY

According to some embodiments, a secondary network node detects a first data transmission of media content from a primary network node to a first wireless device. The first data transmission has a first data quality description $D(n1)$ and a first transport format $T(k1)$. The secondary network node selects a second data quality description $D(n2')$ and a second transport format $T(k2')$ for a second data transmission. The second data quality description $D(n2')$ and second transport format $T(k2')$ differ from the first data quality description $D(1)$ and first transport format $T(k1)$, respectively. The secondary network node transmits the second data transmission to a second wireless device according to the second data quality description $D(n2')$ and the second transport format $T(k2')$. The second data transmission includes at least a portion of the media content.

In some embodiments, the secondary network node detects an uplink signal from the second wireless device, determines a signal quality for the uplink signal, and selects the second data quality description $D(n2')$ and the second transport format $T(k2')$ based on the signal quality determined for the uplink signal.

In some embodiments, the secondary network node transmits a beacon signal, receives a channel quality indicator (CQI) indicating a channel quality that the second wireless device associates with the beacon signal, and selects the second data quality description $D(n2')$ and the second transport format $T(k2')$ based on the CQI.

In some embodiments, the secondary network node operates in an open loop configuration such that the secondary network node selects the second data quality description $D(n2')$ and the second transport format $T(k2')$ independently of signals received from wireless devices.

In some embodiments, the secondary network node sends a message to the primary network node indicating that the second wireless device is within coverage of the secondary network node.

In some embodiments, the secondary network node selects a third data quality description $D(n3')$ and a third transport format $T(k3')$ for a third data transmission, the third data quality description $D(n3')$ different than the second data quality description $D(n2')$ and the third transport format $T(k3')$ different than the second transport format $T(k2')$. The data quality descriptions and transport formats may be selected according to an open loop configuration (independently of signals received from wireless devices) or according to a closed loop configuration (using signals received from wireless devices). The secondary network node may transmit the third data transmission, which includes at least a portion of the media content, from the secondary network node to a third wireless device according to the third data quality description $D(n3')$ and the third transport format $T(k3')$. In some embodiments, if the third transport format is more robust than the second transport format, instead of transmitting the second data transmission, the secondary network node simultaneously transmits the third data transmission from the secondary network node to the second wireless device and to the third wireless device.

In some embodiments, the second data transmission is separated from signals transmitted by the primary network node according to one or more of frequency, time, and code.

In some embodiments, the secondary network node further determines that the second wireless device is capable of interference cancellation and, in response, aligns the timing of the second data transmission relative to signals transmitted by the primary network node.

According to some embodiments, a wireless device detects a first data transmission of media content from a primary network node. The first data transmission has a first data quality description $D(n2)$ and a first transport format $T(k2)$. The wireless device detects a second data transmission of at least a portion of the media content from a secondary network node. The second data transmission has a second data quality description D(n2') and a second transport format T(k2'). The second data quality description D(n2') is different than the first data quality description D(n2) and the second transport format T(k2') is different than the first transport format T(k2). The wireless device determines the media content based on at least one of the first data transmission and the second data transmission.

In some embodiments, the wireless device receives a beacon signal from the secondary network node and transmits a channel quality indicator (CQI) to the secondary network node. The CQI indicates a channel quality that the wireless device associates with the beacon signal.

In some embodiments, the wireless device determines the media content based on combining the first data transmission and the second data transmission.

In some embodiments, the wireless device is further operable to send a message to the primary network node indicating that the wireless device is within coverage of the secondary network node.

In some embodiments, the wireless device is further operable to indicate to at least one of the primary network node and the secondary network node whether wireless device is capable of interference cancellation.

In some embodiments, the wireless device is further operable to determine whether to use signal separation on the uplink based on whether the secondary network node is capable of interference cancellation.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

As further described below, a primary base station delivers media content to wireless devices in its coverage area. in particular embodiments, a secondary base station eavesdrops on the primary base station. The secondary base station uses the information that it obtains through eavesdropping to improve the quality/reliability of the media content delivered to disadvantaged users. The secondary base station may act with various degrees of independence from the primary base station and the network. By serving certain disadvantaged users via the secondary base station, the primary base station may be relieved from serving those users and may allocate the primary base station resources to other tasks. The secondary base station may be in a better position to serve certain disadvantaged users. This may allow media to be delivered to those users with a higher quality.

Figure 1:
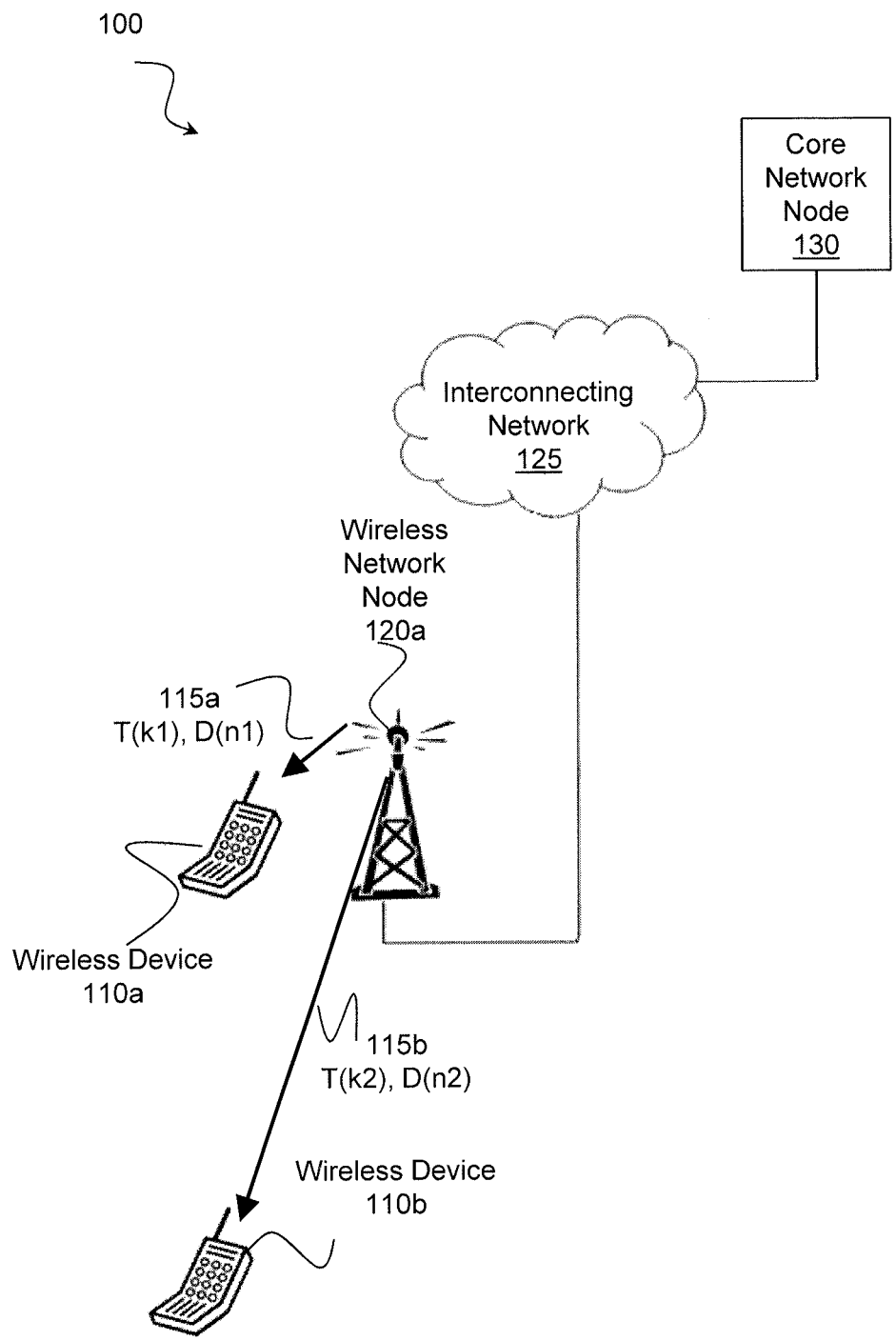
FIG. 1 is a block diagram illustrating an example of a network.

FIG. 1 is a block diagram illustrating an example of a network according to some embodiments. The network nodes include wireless network nodes 120 (such as a base station or eNodeB) and core network nodes 130. In general, wireless devices 110 within coverage of a wireless network node 120 communicate with the wireless network node 120 over a wireless interface. For example, wireless devices 110 and wireless network nodes 120 may communicate wireless signals containing voice traffic, data traffic, and control signals. Core network node 130 manages the establishment of communication sessions and various other functionality for wireless device 110. The network nodes connect through interconnecting network 125, which refers to any interconnecting system capable of transmitting audio, video, signals, data, messages, or any combination of the preceding. Examples of wireless device 110, wireless network node 120, and core network node 130 are further described below with respect to FIGS. 6, 7, and 8, respectively.

As shown in FIG. 1, wireless network node 120a sends media content to wireless communication devices 110a and 110b via data transmissions 115a and 115b, respectively. Any suitable media content may be transmitted, such as a portion of a movie, a television program, a song, streaming content, etc. Wireless network node 120a transmits each data transmission 115 according to a data quality description D(n) and a transport format T(k) selected for the transmission.

With respect to the data quality description D(n), the highest data quality description would have no or very low distortion and would require the greatest number of bits. The lowest data quality description would have the most distortion and would require the fewest number of bits. Assuming some number N of quality levels, the data quality descriptions may be arranged in increasing order of quality and number of bits with D(n=1) being the lowest quality and D(n=N) being the highest quality.

With respect to the transmission format T(k), wireless network node 120 may support transport formats with various levels of robustness, designed to achieve a certain performance target, such as block error rate (BLER), in channels with various conditions. Various transport format characteristics may be adjusted in an effort to meet the performance target. Examples of transport format characteristics include error control coding, modulation, multiple input/multiple output (MIMO) streams, etc. Assuming some number K of channel quality levels, the transport format T(k) may be arranged in decreasing order of robustness with T(k=1) being the most robust transport format for the lowest quality channel, and T(k=K) being the least robust transport format for the highest quality channel.

The data quality description D(n) and the transport format T(k) may be selected based at least in part on the wireless channel quality. In FIG. 1, the first wireless device 110a is located closer to wireless network node 120a and may be experiencing relatively good channel conditions while the second wireless device 110b is located further from wireless network node 120b and may be experiencing relatively bad channel conditions. Wireless network node 120a transmits the first data transmission 115a to the first wireless device 110a using a transport format T(k1) and a data quality description D(n1) suitable for good channel conditions. As an example, wireless network node 120 may configure a less robust transport format (e.g., T(k1) may be configured with k1=K) and a higher quality description (e.g., D(n1) may be configured with n1=N).

Wireless network node 120a transmits the second data transmission 115b to the second wireless device 110b using a transport format T(k2) and a data quality description D(n2) suitable for bad channel conditions. As an example, wireless network node 120 may configure a more robust transport format (e.g., T(k2) may be configured with k2=1) to increase the likelihood that wireless device 110b successfully receives the media content. Use of a more robust transport format may allow wireless network node 120 to use a corresponding lower quality description, such as D(n2) configured with n2=1. For instance, guidelines may be applied to keep the resource use roughly constant.

Wireless network node 120a may select the data quality description D(n) and transport format T(k) when operating in any suitable mode, such as unicast mode, broadcast mode, or simulcast mode. First consider a simple unicast mode where wireless network node 120a has channel quality information (CQI) fed back from wireless devices 110a and 110b. For each device 110 receiving a separate/unicast message, wireless network node 120a chooses a transport format T(k) to match the CQI and then chooses a corresponding quality description D(n). The resulting data transmission is communicated over the air and received by the intended wireless device 110.

At the other extreme, in a simple broadcast mode, with no feedback from wireless devices 110, wireless network node 120 chooses a robust transport format T(k), say T(1), to cover the cell edge reliably, with a corresponding low quality description D(n), say D(1). As a result, wireless devices 110 in good channel conditions, typically closer to the cell center, which could have enjoyed D(2) or better, are unable to benefit from their good fortune. In a more sophisticated broadcast mode, wireless network node 120 transmits multiple quality descriptions D(n), using their associated transport formats T(k), enabling wireless devices 110 to receive the best description their channel quality allows.

In a simulcast mode, wireless network node 120 has CQI feedback from the intended wireless devices 110 and can make more informed decisions about which combinations of data quality descriptions D(n) and transport formats T(k) to use in order to best serve those users.

Figure 2:
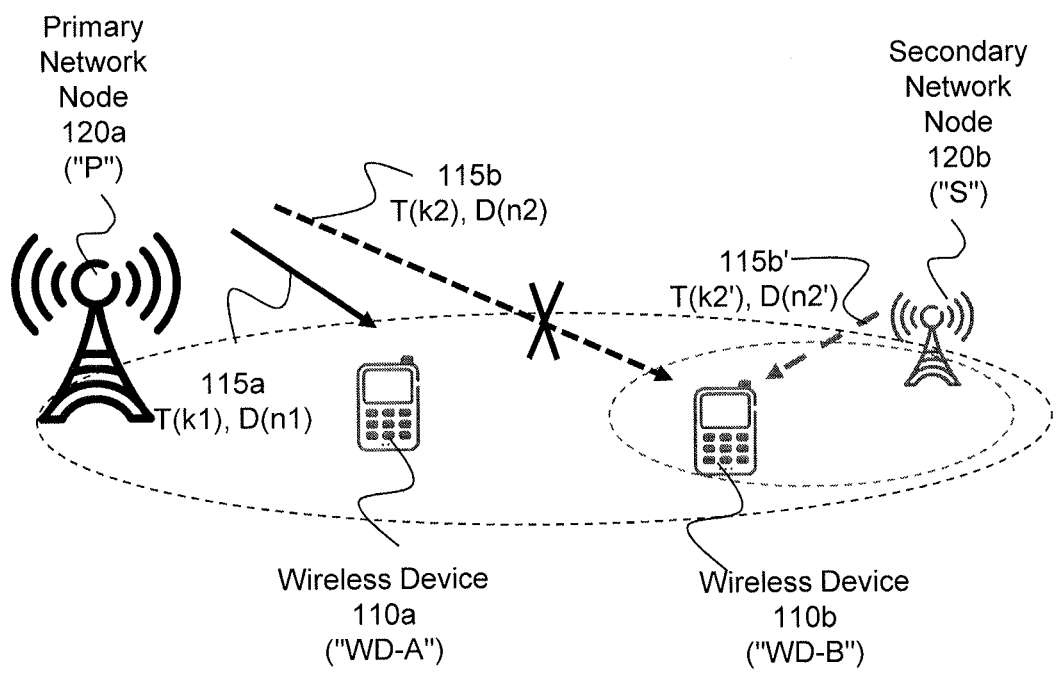
FIG. 2 is a block diagram illustrating an example embodiment of a network implementing both a primary network node and a secondary network node to aid multiple description media broadcast.

FIG. 2 is a block diagram illustrating an example embodiment of a network implementing both a primary network node 120a (referred to hereinafter as "P") and a secondary network node 120b (referred to hereinafter as "S") to aid multiple description media broadcast. As an example, in some embodiments, P and S may be part of a heterogeneous network where P has a relatively large cell size and S has a smaller cell size with a coverage area that at least partially overlaps that of P (e.g., in some embodiments, the coverage area of S may be substantially within the coverage area of P or fully within the coverage area of P). This is not a requirement, however, and in other embodiments a homogeneous network could be used or S could have a larger coverage area than P, for example.

A number of wireless devices 110 attach to P in the usual way. As illustrated in FIG. 2, a first wireless device 110a (hereinafter referred to as "WD-A") is located relatively close to P and a second wireless device 110b (hereinafter referred to as "WD-B") is located further away from P. For the purposes of simplicity and explanation, assume that the channel quality between WD-A and P is relatively good and the channel quality between WD-B and P is relatively bad.

In FIG. 2, WD-A is outside the range of S and WD-B is within range of S. For purposes of simplicity and explanation, assume that the channel quality between WD-B and S is better than the channel quality between WD-B and P. S is aware of the presence of WD-B within its range. In some embodiments, S becomes aware of the presence of WD-B within its range by eavesdropping on uplink transmissions from WD-B to P. In certain embodiments, WD-B need not be explicitly aware of S. In other embodiments, WD-B knows if it is within range of S. This may be handled by S transmitting a beacon that enables WD-B to figure out when it is within range. WD-B may acknowledge its presence by sending a message to S.

WD-A and WD-B may be configured to receive the same media content, for example, if the users of these devices are watching the same movie at the same time. The network delivers the media content to WD-A and WD-B via data transmissions 115. In general, P sends a first data transmission 115a to WD-A using a relatively high quality description D(n1) and a corresponding transport format T(k1). S eavesdrops on the first data transmission 115a to WD-A and transcodes data quality description D(n1) into data quality description D(n2') for transmission to WD-B. The data quality description D(n2') is of higher quality than D(n2), which P otherwise would have transmitted to WD-B via data transmission 115b (e.g., if WD-B had been outside the coverage of S, or S was not able to serve WD-B for any reason). In the embodiment, S transmits data transmission 115b' to WD-B using data quality D(n2') and a corresponding transport format T(k2').

When eavesdropping, S may receive/overhear data transmission 115a from P with relatively high reliability, for example, if the receive antennas of S are placed at a higher, less obstructed location than WD-B (e.g., having a less obstructed signal generally improves channel quality), if S's antennas are placed outside (even if the antennas serve an indoor cell), or if S has a better receiver front end, a larger number of receive antennas, or more digital processing capability (to enable higher performance algorithms) than WD-B.

Consider the unicast example where WD-A is in good channel conditions towards P and is served data transmission 115a with data quality description D(n1) and transport format T(k1). Because the channel quality is good, data quality description D(n1) has a high data quality, such as n1=N, and a corresponding transport format, such as k1=K. Recall that the data quality descriptions may be arranged from 1 to N, with N corresponding to the highest data quality available, and transport formats may be arranged from 1 to K, with K corresponding to the least robust transport format. In general, higher quality data descriptions may be transmitted with sufficient reliability even when using less robust transport formats due to the high quality of the data. Using less robust transport formats when possible may conserve network resources for use in other tasks.

In the example, S eavesdrops on data transmission 115a and receives it reliably. WD-B does not receive data transmission 115a. Instead of P serving WD-B with a low combination D(n2) with T(k2), S takes over. In some embodiments, S knows the channel quality to WD-B. S determines the right transport format index T(k2'), where k2'>k2. Having successfully retrieved the description D(n1) from eavesdropping on data transmission 115a, S may transcode (decode and encode) the media content to the quality n2' suited to match k2', where n2'>n2. This is possible as long as n2'<n1 (and n2'=n1, when it needs no transcoding). Even if S could theoretically support n2'>n1, it would settle for n1 because a high quality description cannot be produced from a lower quality one absent additional information, which we assume S does not have. In the alternative, in embodiments where S has additional information, it may be possible to produce a high quality description from a lower quality information.

S transmits data transmission 115b' to WD-B using D(n2') and T(k2'). WD-B receives data transmission 115b' reliably. As described, in some embodiments, S sends data transmission 115b' to WD-B with a more robust transport format and a lower quality data description than data transmission 115a from P to WD-A. Even so, the data quality from S to WD-B in data transmission 115b' may be higher than the data quality that would have been possible in a data transmission 115b from P to WD-B. In addition to WD-B enjoying a higher quality description than would have been possible if data transmission 115b was sent directly from P to WD-B (because n2'>n2), the energy expanded by S to serve WD-B is typically lower than that expended by P because WD-B likely enjoys a better link from nearby S than from distant P. This is an advantage in terms of both energy savings and interference reduction.

One remaining issue is how S obtains the channel quality information (e.g., CQI) about the channel from S to WD-B. One simple way is to eavesdrop on uplink messages that S receives/overhears from WD-B and invoke symmetry of the uplink and the downlink. In a time division duplex (TDD) setting, the channel is substantially the same, so the knowledge is generally accurate. In a frequency division duplex (FDD) setting, the knowledge is generally only accurate in an average sense, but it can still be used as a simple approximation. Another solution is for S to transmit a beacon, as discussed earlier, which triggers a response from WD-B within range. The response indicates the channel quality that WD-B receives from S (e.g., in the response, WD-B includes the CQI of the channel from S to WD-B).

In the preceding example, S operates in closed loop and selects a k2' and n2' based on the channel quality from S to WD-2. In other embodiments, such as when the cell of S is small, S may be able to operate in open loop. That is, S can choose one or more combinations (k2', n2'), (k2", n2"), etc. to cover its cell independently of any feedback from wireless devices 110. The open loop approach still benefit most if not all wireless devices 110 in cell S in the sense that n2'>n2. In this case, S need not know the CQI from WD-B in its cell (and, in some embodiments, S need not even know that WD-B is within coverage of S). WD-B should be aware of S so it listens to S for data transmission 115b'.

In another embodiment, P may operate in simulcast mode and may have CQI feedback from the intended users of the media content, such as WD-A and WD-B. P can choose combinations of T(k) and D(n) accordingly to serve them. Now suppose that S knows from eavesdropping on P that devices WD-A and WD-B are in simulcast. By eavesdropping targeted to the simulcast users, S knows approximately which users are within its cell. Alternatively, S transmits a beacon, which users acknowledge, so again S knows which are with its cell. So overall S knows which subset of the users active in simulcast are in its cell (e.g., WD-B).

Now S can relieve P from serving some or all the users in the subset. To do so, P may be informed about which users can be handled by S. If S can communicate with P, either directly over the air, or indirectly via backhaul, it can inform P itself. Alternatively, users listening to S, such as WD-B, can inform P.

The closed loop and/or the open loop approaches described earlier for unicast may also be used in simulcast. First, S eavesdrops on P and retrieves the highest quality description D(n1) among those transmitted by P. In a closed loop approach, it has CQI feedback from WD-B, so it chooses a combination (k2', n2') based on the channel quality. Then S sends data transmission 115b' to WD-B in its cell. The same conditions about description quality hold as before. That is n2'<n1, and WD-B should listen to S if n2'>n2 (which it would get from P). If a third wireless device WD-C (not shown) participates in the simulcast, is in the coverage of S, and has a different channel quality than WD-B, S may choose a different combination (e.g., k3', n3') for sending a data transmission 115c to WD-C. Alternatively, it may choose the more robust combination (e.g., (k3', n3') if k3'<k2') and serve WD-B and WD-C simultaneously.

In the alternative open loop approach, S is effectively in broadcast mode, so it chooses a single combination (k2', n2') to cover its cell. Any terminal in its cell with n2'>n2 will benefit. Extending the broadcast mode as described earlier, S may transmit multiple combinations (k2',n2'), (k2", n2"), etc., enabling users to receive the best description that their channel quality allows.

Turning now to signal interference considerations, as noted earlier, in certain embodiments S is a small cell and P is a large cell. The key distinction between a small cell and a large cell is that the small cell has lower transmit power and therefore a smaller coverage area. The small cell may also be positioned closer to the ground. In general, a user within range of S may be assumed to be close to it, and usually the user in range of S is closer to S than to P.

On the downlink, signals that WD-B receives from P may overwhelm/interfere with signals that WD-B receives from S. Thus, there may be a need to separate the two. One solution is to separate the signals in frequency, time, code, or some combination thereof. Specific solutions developed in the context of heterogeneous networks can be adopted here as well. This includes approaches such as almost blank subframe, or reduced power subframe. Any kind of signal separation requires P to give up some of its resources to S, assuming there are no new resources to tap into. However, this is still an advantage overall, as P is freed up by S to handle other tasks.

If the receiver of WD-B is capable of interference cancellation, then it can receive and remove the dominant signal from P with high reliability, uncovering the weaker signal from S. In this case, signal separation may not be necessary. Time alignment between the transmission from S and P would simplify the task of the receiver at WD-B.

On the uplink, the proximity of WD-B to S suggests that it may be possible to avoid signal separation. However, some users connected to P but not S may be transmitting at peak power to overcome distance and may overwhelm those signals intended for S. If S has a receiver capable of interference cancellation, then as before, signal separation may not be needed. If S does not have interference cancellation, then signal separation analogous to that discussed for the downlink may be desired.

With respect to connections between the backhaul network and S, recall that S obtains information by eavesdropping on P or wireless devices 110. In some embodiments, S may be connected to the backhaul network to communicate with P, for example, to indicate to P that WD-B or other wireless devices 110 are within the coverage of S. In some embodiments, S does not need to be connected to the backhaul network for the purposes of communicating with P. For example, S may operate independently of P without P knowing that S is transcoding media content overheard from P and sending the media content to wireless devices 110 within the coverage of S. S may still need to be connected to the network for other purposes, such as network management. But that connection may only be needed occasionally, and it would require much lower bandwidth than the connection between P and the network.

Figure 3:
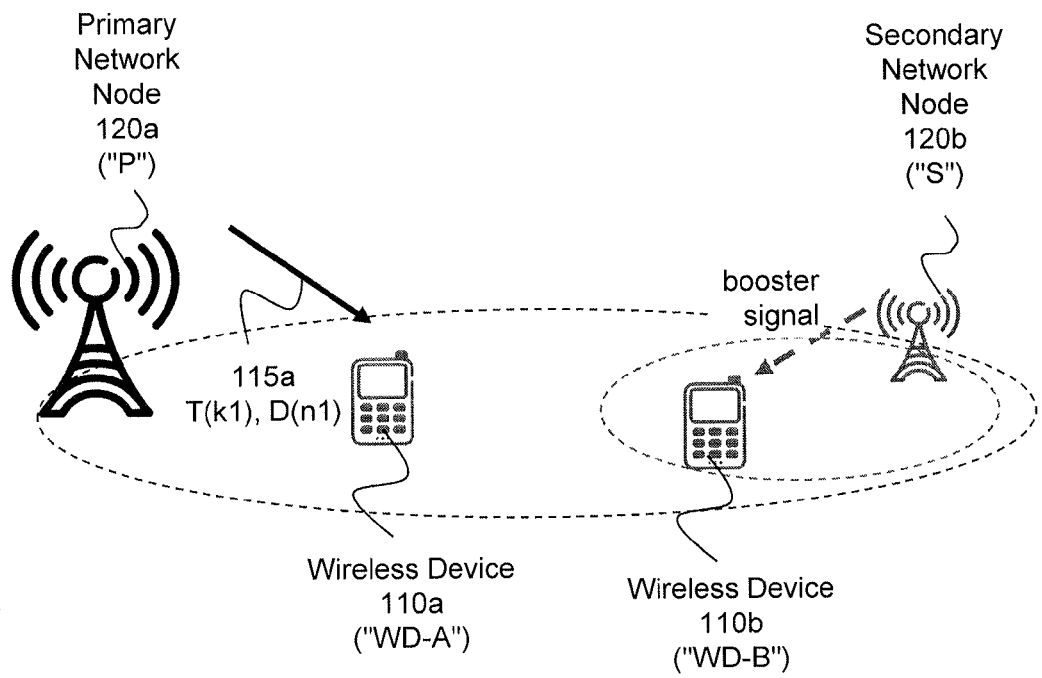
FIG. 3 is a block diagram illustrating an example embodiment of a secondary network node providing a booster signal to aid multiple description media broadcast.

FIG. 3 is a block diagram illustrating an example embodiment of a secondary network node providing a booster signal to aid multiple description media broadcast. Similar to FIG. 2, FIG. 3 includes a primary network node 120a ("P"), secondary network node 120 ("S"), and wireless devices 110a ("WD-A") and 110b ("WD-B") that are users of media content. P sends data transmission 115a with a higher quality description D(n1) using transport format T(k1) to WD-A. WD-B receives data transmission 115a unreliably and keeps the baseband samples of data transmission 115a. S eavesdrops on data transmission 115a and receives it successfully. S retrieves D(n1), and transmits a booster signal to WD-B based on D(n1). Then WD-B combines the samples from the first data transmission 115a and the booster signal to retrieve D(n1).

Thus, if WD-B does not receive the signal from P reliably, it can store the baseband samples and wait for a booster signal from S. Specifically, S retrieves D(n1) by eavesdropping as before, but it does not transcode D(n1). Instead, S re-transmits a booster signal based on D(n1). The simplest approach is to reuse the same transport format T(k1), resulting in the same signal, whose power may be scaled appropriately. Then WD-2 gets a second copy of the same signal, which it may combine with the stored copy in any of a number of suitable ways. For example, it may treat the 2 copies as 2 receive antenna signals, or it may combine the soft or hard bits in the error control decoder. The result is a performance boost, which may be enough to enable WD-B to retrieve D(n1).

In a more sophisticated approach, S can transmit complementary bits from the same error control encoder used by P. For example, P may use a puncturing pattern and transmit the subset of unpunctured bits in the original data transmission 115a. Then S may use the same code, produce the same set of bits, and transmit the previously punctured bits in the booster signal (e.g., in a manner similar to certain modes of retransmission in modern ARQ systems). Then WD-2 can combine the soft or hard bits from the stored signal and the new signal in the error control decoder.

In general, S can apply any appropriate transport format to D(n1) to boost the performance of WD-B. WD-B may not find either signal from P and S reliable alone, but together they become reliable.

Figure 4:
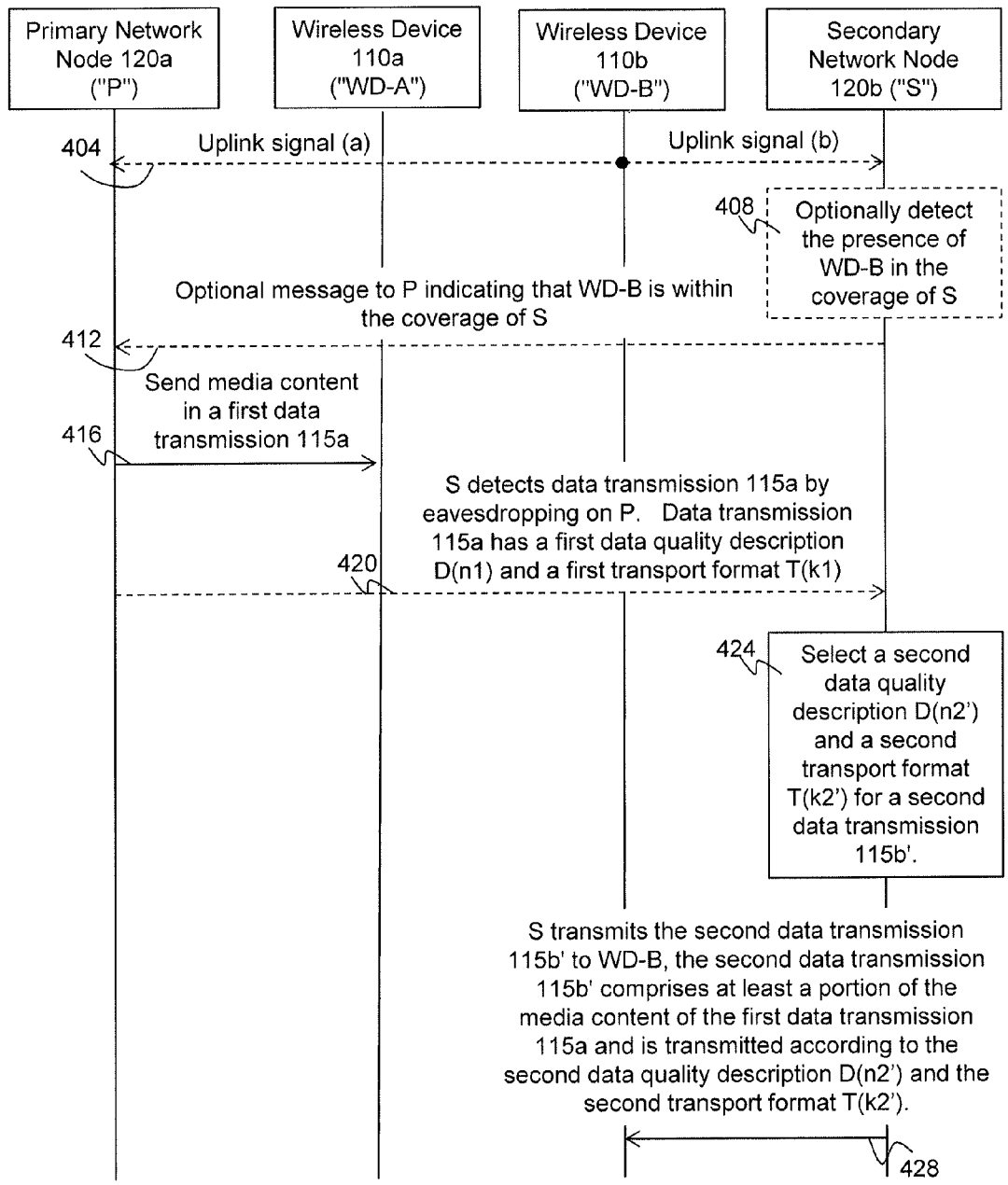
FIG. 4 is a signal flow illustrating an example embodiment of a method using a secondary network node for aiding multiple description media broadcast.

FIG. 4 is a signal flow illustrating an example embodiment of a method using a secondary network node for aiding multiple description media broadcast. The method may be performed in a network that includes a primary network node 120a ("P"), secondary network node 120 ("S"), and wireless devices 110a ("WD-A") and 110b ("WD-B") analogous to those discussed with respect to FIGS. 2-3 above.

At step 404, WD-B transmits and S optionally receives an uplink signal. In one embodiment, WD-B transmits the uplink signal (a) to P and S optionally eavesdrops on uplink signal (a). In another embodiment, WD-B transmits uplink signal (b) directly to S. For example, if S transmits a beacon, WD-B may respond with uplink signal (b) to indicate the channel quality with which WD-B receives S's beacon.

At step 408, S optionally detects the presence of WD-B in the coverage of S. For example, S may opt to detect the presence of WD-B when S is operating in a closed loop mode and may or may not opt to detect the presence of WD-B when S is operating in an open loop mode. In some embodiments, S detects the presence of WD-B in response to indirectly receiving uplink signal (a) (when S eavesdrops on WD-B) or directly receiving uplink signal (b) (when WD-B sends a message in response to receiving a beacon transmitted by S).

At step 412, S optionally sends P a message indicating that WD-B is within the coverage of S. The message may indicate to P that S is handling data transmissions to WD-B. Accordingly, P may allocate its resources to tasks other than data transmissions to WD-B. In another embodiment, the message indicating that WD-B is within the coverage of S may be sent from WD-B to P, rather than from S to P. In yet another embodiment, P need not be aware that S is handling data transmissions to WD-B and step 412 may be skipped. In this embodiment, both P and S may send data transmissions to WD-B, and WD-B may combine the information in the transmissions (e.g., in the case where S sends a booster signal as described with respect to FIG. 3 above) or may use the data transmission from either one of P or S (e.g., whichever transmission WD-B receives the most reliably).

At step 416, P sends media content to WD-A in a first data transmission 115a. Data transmission 115a may be sent according to any suitable technique, such as a unicast, broadcast, or multicast technique described above with respect to FIG. 2. Data transmission 115a has a first data quality description D(n1) and a first transport format T(k1). If the wireless channel quality between P and WD-A is good, as is typically the case when WD-A is located close to P, P may select a high data quality for D(n1) (e.g., n1=N) and a less robust transport format for T(k1) (e.g., k1=K).

At step 420, S detects the first data transmission 115a by eavesdropping on P. S may determine the first data quality description D(n1) and the first transport format T(k1) associated with the first data transmission 115a.

At step 424, S selects a second data quality description D(n2') and a second transport format T(k2') for sending the media content to WD-B in a second data transmission 115b'. The second data quality description D(n2') may be different than the first data quality description D(n1) and the second transport format T(k2') may be different than the first transport format T(k1). In general, the second data quality description D(n2') may be lower quality than the first data quality description D(n1), however, the second transport format T(k2') may be more robust than the first transport format T(k1). Even if D(n2') is lower in quality than D(n1), it may be higher quality than a data quality description D(n2) that P would need to use to reliably send data transmissions to WD-B. For example, if the wireless channel quality from S to WD-B is better than the wireless channel quality from P to WD-B, as is typically the case when WD-B is located close to S and far away from P, the data quality description D(n2') sent from S to WD-B would likely be higher quality than the data quality description D(n2) possible from P to WD-B.

In certain closed loop embodiments, S selects the second data quality description D(n2') and the second transport format T(k2') based on eavesdropping on an uplink signal from WD-B to P (such as the uplink signal (a) from WD-B to P in step 404). S determines the signal quality for the uplink signal and approximates the downlink signal quality based on symmetry (or near symmetry) of the uplink channel and downlink channel quality. S then uses the approximated downlink signal quality to select an appropriate D(n2') and T(k2').

In certain other closed loop embodiments, S selects the second data quality description D(n2') and the second transport format T(k2') based on receipt of an uplink signal directly from WD-B to S (such as the uplink signal (b) from WD-B to S in step 404). Uplink signal (b) contains a channel quality indicator (CQI) indicating a channel quality that WD-B associates with a beacon signal transmitted by S.

In certain open loop embodiments, S selects the second data quality description D(n2') and the second transport format T(k2') independently of signals received from wireless devices 110. For example, S selects a D(n2') and T(k2') likely to be beneficial to a number of wireless devices 110. S may optionally select multiple data quality descriptions and multiple transport formats in an effort to better serve more wireless devices 110 in its coverage. As an example, S may select a third data quality description D(n3') and a third transport format T(k3') in open loop mode and independently of feedback signals received from wireless devices 110. Each wireless devices 110 within the coverage of S may then use either the combination of D(n2') and T(k2') or the combination of D(n3') and T(k3') depending on which combination the particular wireless device 110 is able to receive the most reliably given its current channel conditions.

At step 428, S transmits the second data transmission 115b' to WD-B. Second data transmission 115b' may be sent directly to WD-B (e.g., in unicast or simulcast operation) or indirectly to WD-B (e.g., via broadcast operation where S does not necessarily know which wireless devices 110 are intended to receive second data transmission 115b'). The second data transmission 115b' comprises at least a portion of the media content of the first data transmission. For example, some of the bits of the media content may have been removed in the process of transcoding the media content from a higher quality description D(n1) to a lower quality description D(n2').

S transmits the second data transmission 115b' according to the second data quality description D(n2') and the second transport format T(k2') selected at step 424. Any suitable steps may be used to mitigate downlink interference and to improve the likelihood that WD-B successfully receives second data transmission 115b' from S. For example, one or more of frequency, time, and code separation may be used to separate second data transmission 115b' from various signals sent by P. As another example, S may be further operable to determine that WD-B is capable of interference cancellation and, in response, S may align the timing of the second data transmission relative to timing of the various signals sent by P.

Steps similar to 404 to 428 may be repeated for any suitable number of wireless devices 110 within coverage of S. As an example, S may select a third data quality description D(n3') and a third transport format T(k3') for a third data transmission 115c' that a third wireless device 110c (WD-C) receives from S. The selection of the third data quality description D(n3') and the third transport format T(k3') may be performed in a closed loop or open loop mode, for example, using techniques analogous to the selection of the second data quality description D(n2') and the second transport format T(k2') described in step 424. The third data quality description D(n3') is different than the second data quality description D(n2') and the third transport format T(k3') is different than the second transport format T(k2').

S sends the third data transmission 115c' according to a unicast, simulcast, or broadcast technique, and WD-C receives third data transmission 115c'. The third data transmission 115c' comprises at least a portion of the media content of the first data transmission 115a, and S transmits the third data transmission 115c' according to the third data quality description D(n3') and the third transport format T(k3'). In some embodiments, S configures the third data transmission 115c' as a booster of the first data transmission 115a. To configure a booster signal, S selects the third data quality description D(n3') to be the same as the first data quality description D(1) and the third transport format T(k3') to be the same as the first transport format T(k1). S may scale the power of the booster signal to a value intended to ensure reliable receipt by WD-C without creating undue interference for other wireless devices 110.

Figure 5:
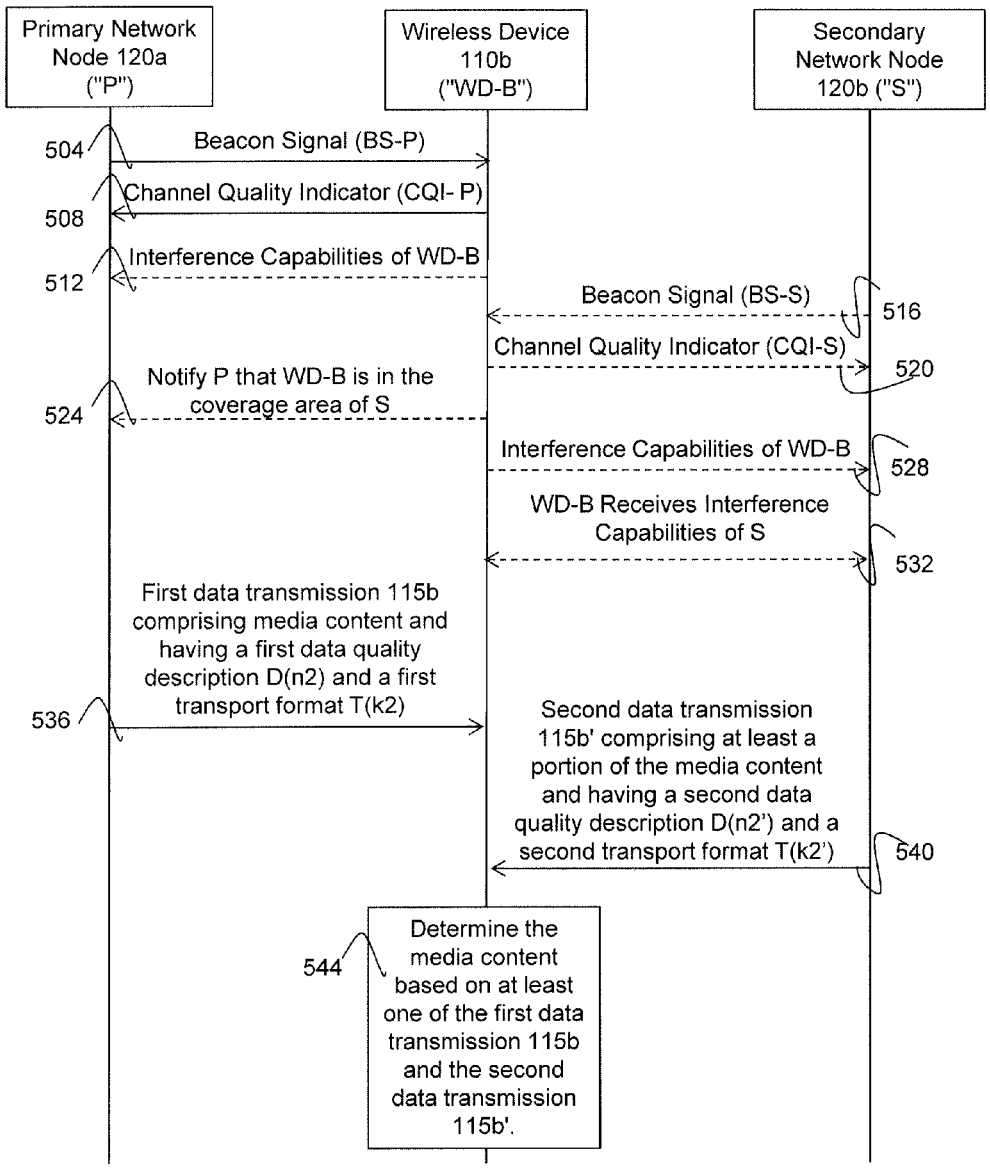
FIG. 5 is a signal flow illustrating an example embodiment of a method in a wireless device that detects data transmissions from a primary network node and a secondary network node.

FIG. 5 is a signal flow illustrating an example embodiment of a method in a wireless device that detects data transmissions from a primary network node and a secondary network node. The method may be performed in a network that includes a primary network node 120a ("P"), secondary network node 120 ("S"), wireless devices 110a ("WD-A") (not shown) and wireless device 110b ("WD-B") analogous to those discussed with respect to FIGS. 2-3 above.

At step 504, WD-B within coverage of P receives a beacon signal (BS-P). At step 508, WD-B sends P a channel quality indicator (CQI-P) to indicate the channel quality that WD-B associates with beacon signal (BS-P). Depending on the embodiment, WD-B may optionally send P its interference capabilities at step 512. P may use the interference capability information to determine whether it may be necessary to use time, frequency, and/or code-based signal separation to separate P's future transmissions from S's future transmissions (e.g., if WD-B does not support interference cancellation) or to determine whether to time align P's future transmissions with S's future transmissions (e.g., if WD-B does support interference cancellation).

At some point in time, WD-B enters a coverage area of S that overlaps the coverage area of P. In some embodiments, S optionally transmits a beacon signal (BS-S). For example, S may transmit beacon signal (BS-S) in certain closed loop embodiments where S intends to adjust data transmission characteristics based on the channel quality. If WD-B receives beacon signal (BS-S) at step 516, WD-B responds at step by sending S a channel quality indicator (CQI-S) at step 520 to indicate the channel quality that WD-B associates with beacon signal (S).

In some embodiments, WD-B optionally sends a message to P indicating that the WD-B is within coverage of S. The message may indicate to P that S is handling data transmissions to WD-B. Accordingly, P may allocate its resources to tasks other than data transmissions to WD-B. In another embodiment, the message indicating that WD-B is within the coverage of S may be sent from S to P, rather than from WD-B to P. In yet another embodiment, P need not be aware that S is handling data transmissions to WD-B and step 524 may be skipped.

At step 528, WD-B optionally indicates to S whether WD-B is capable of interference cancellation. S may use the interference capability information to determine whether it may be necessary to use time, frequency, and/or code-based signal separation to separate S's future transmissions from P's future transmissions (e.g., if WD-B does not support interference cancellation) or to determine whether to time align S's future transmissions with P's future transmissions (e.g., if WD-B does support interference cancellation).

At step 532, WD-B optionally receives information that describes the interference cancellation capabilities of S. For example, WD-B may request S's interference capabilities and receive the S's interference capabilities in a response message. Or, S may send its interference capabilities to WD-B on its own (without receiving a request from WD-B). If WD-B obtains interference cancellation capabilities of S, WD-B determines whether to use signal separation on the uplink accordingly.

At step 536, WD-B detects a first data transmission 115b from P. First data transmission may be a unicast, simulcast, or broadcast transmission. The first data transmission 115b comprises media content and has a first data quality description D(n2) and a first transport format T(k2). In certain closed loop embodiments, P selects the first data quality description D(n2) and the first transport format T(k2) based on the CQI-P information received from WD-B at step 508. Or, in certain open loop embodiments, P selects first data quality description D(n2) and first transport format T(k2) intended to be beneficial to a number of wireless devices 110 within P's coverage.

At step 540, WD-B detects a second data transmission 115b' from S. The second data transmission 115b' comprising at least a portion of the media content that was included in P's first data transmission 115b. The second data transmission 115b' has a second data quality description D(n2') and a second transport format T(k2'). In some embodiments, the second data quality description D(n2') is different than the first data quality description D(n2) and the second transport format T(k2') is different than the first transport format T(k2). For example, in certain closed loop embodiments, S selects the second data quality description D(n2') and the second transport format T(k2') based on the CQI-S information received from WD-B at step 520. Or, in certain open loop embodiments, S selects second data quality description D(n2') and second transport format T(k2') intended to be beneficial to a number of wireless devices 110 within S's coverage.

At step 544, WD-B determines the media content based on at least one of the first data transmission 115b and the second data transmission 115b'. For example, WD-B may determine to use the data transmission that it receives the most reliably. In some embodiments, WD-B determines the media content based on combining the first data transmission and the second data transmission. As an example, in some embodiments, second data transmission 115b' may be a power scaled booster signal of first data transmission 115b (e.g., where n2'=n2 and k2'=k2), and WD-B may combine the data transmissions to obtain the media content.

Figure 6:
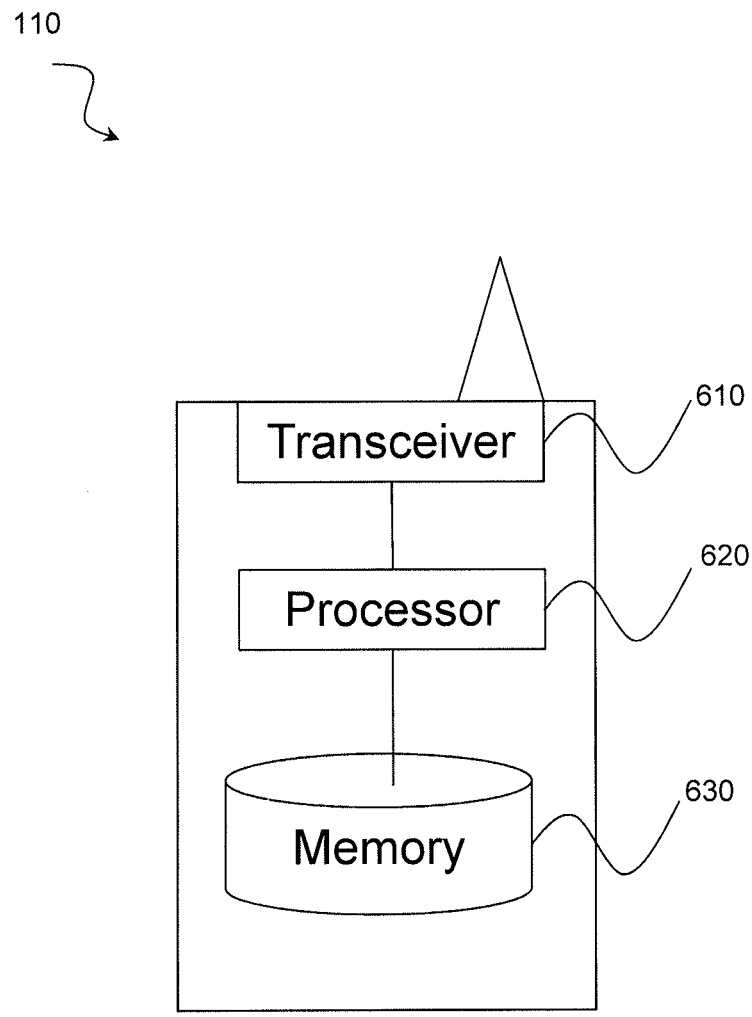
FIG. 6 is a block diagram illustrating an example embodiment of a wireless device.

FIG. 6 is a block diagram illustrating an example embodiment of a wireless device 110 suitably operative in accordance with the principles of the invention. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless device 110 includes transceiver 610, processor 620, and memory 630. In some embodiments, transceiver 610 facilitates transmitting wireless signals to and receiving wireless signals from wireless network node 120 (e.g., via an antenna), processor 620 executes instructions to provide some or all of the functionality described herein as provided by a wireless device 110, and memory 630 stores the instructions executed by processor 620.

Processor 620 includes any suitable combination of hardware and software implemented in one or more integrated circuits or modules to execute instructions and manipulate data to perform some or all of the described functions of wireless device 110. Memory 630 is generally operable to store computer executable code and data. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 include additional components (beyond those shown in FIG. 6) responsible for providing certain aspects of the wireless device's functionality, including any of the functionality described above and/or any additional functionality (including any functionality necessary to support the solution described above).

Figure 7:
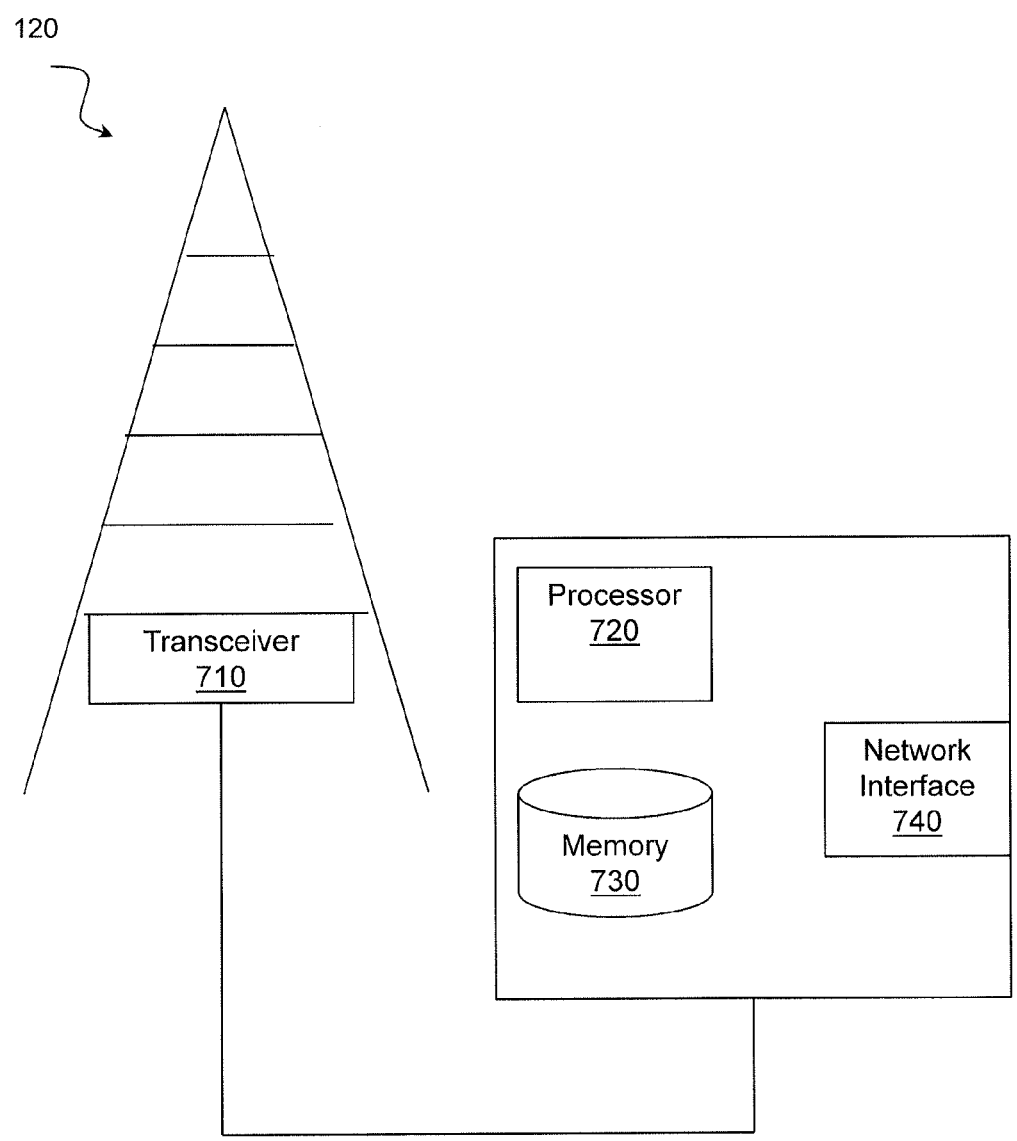
FIG. 7 is a block diagram illustrating an example embodiment of a wireless network node, such as a primary network node or a secondary network node.

FIG. 7 is a block diagram illustrating an example embodiment of a wireless network node 120, such as a primary network node 120a or a secondary network node 120b, suitably operative in accordance with the principles of the invention. Wireless network node 120 can be, for example, a radio access node, such as an eNodeB, a node B, a base station, a wireless access point (e.g., a Wi-Fi access point), a low power node, a base transceiver station (BTS), a transmission point or node, or a remote RF unit (RRU). Other network nodes, such as one or more radio network controllers, can be configured between the radio access nodes and core network nodes 130. Such other network nodes can include processors, memory, and interfaces similar to those described with respect to FIG. 7; such other network nodes, however, might not necessarily include a wireless interface, such as transceiver 710.

Wireless network node 120 includes at least one processor 720, at least one memory 730, and at least one network interface 740; in certain embodiments, wireless network node 120 can also include a transceiver 710. Transceiver 710 facilitates transmitting wireless signals to and receiving wireless signals from wireless device 110 (e.g., via an antenna); processor 720 executes instructions to provide some or all of the functionality described above as being provided by a wireless network node 120; memory 730 stores the instructions executed by processor 720; and network interface 740 communicates signals to backend network components, such as a gateway, switch, router, Internet, Public Switched Telephone Network (PSTN), other wireless network nodes 120, and/or core network nodes 130. The processor 720 and memory 730 can be of the same types as described supra with respect to FIG. 7.

In some embodiments, network interface 740 is communicatively coupled to processor 720 and refers to any suitable device operable to receive input for wireless network node 120, send output from wireless network node 120, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

Other embodiments of wireless network node 120 include additional components (beyond those shown in FIG. 8) responsible for providing certain aspects of the node's functionality, including any of the functionality described above and/or any additional functionality (including any functionality necessary to support the solution described above). The various different types of wireless network nodes may include components having the same physical hardware but configured (e.g., via programming) to support different radio access technologies, or may represent partly or entirely different physical components.

Figure 8:
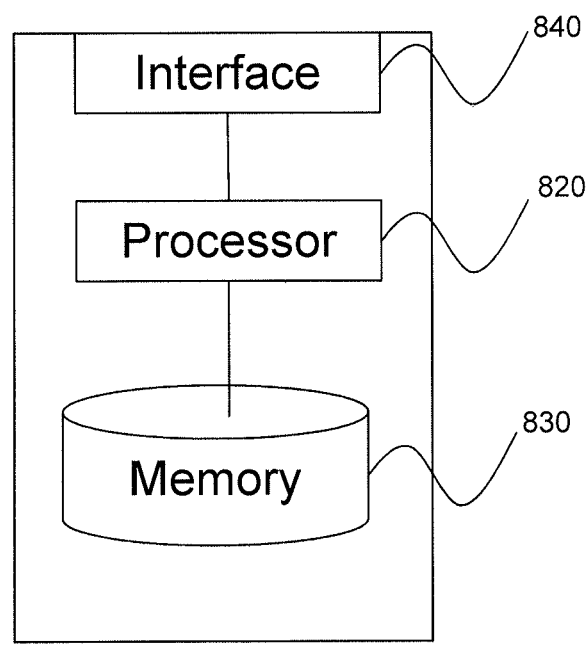
FIG. 8 is a block diagram illustrating an example embodiment of a core network node.

FIG. 8 is a block diagram illustrating an example embodiment of a core network node 130 suitably operative in accordance with the principles of the invention. Examples of a core network node 130 include, but are not limited to, a mobile switching center (MSC), a serving GPRS support node (SGSN), a mobility management entity (MME), a radio network controller (RNC), and a base station controller (BSC). Core network node 130 includes processor 820, memory 830, and network interface 840. Processor 820 executes instructions to provide some or all of the functionality described above as being provided by core network node 130; memory 1030 stores the instructions executed by processor 820; and network interface 840 communicates signals to other network nodes. The processor 820 and memory 830 can be of the same types as described supra with respect to FIG. 6.

In some embodiments, network interface 840 is communicatively coupled to processor 820 and may refer to any suitable device operable to receive input for core network node 130, send output from core network node 130, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network. Other embodiments of core network node 130 include additional components (beyond those shown in FIG. 8) responsible for providing certain aspects of the core network node's functionality, including any of the functionality described above and/or any additional functionality (including any functionality necessary to support the solution described above).

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions also may be made to the methods disclosed herein without departing from the scope of the invention. The methods may include more, fewer, or other steps. Additionally, steps may be performed in any suitable order.

The above description of the embodiments does not constrain this disclosure. Other changes, substitutions, and alterations are possible without departing from the spirit and scope of this disclosure, as defined by the following claims.

The invention claimed is:

1. A secondary network node for data transmissions, comprising:
   one or more processors; and
   a non-transitory computer-readable storage medium further including computer-readable instructions that, when executed by the one or more processors, are configured to:
      detect a first data transmission from a primary network node to a first wireless device, the first data transmission comprising media content and having a first data quality description D(n1) and a first transport format T(k1);
      select a second data quality description D(n2') and a second transport format T(k2') for a second data transmission, the second data quality description D(n2') different than the first data quality description D(n1) and the second transport format T(k2') different than the first transport format T(k1); and
      transmit the second data transmission from the secondary network node to a second wireless device, the second data transmission comprising at least a portion of the media content of the first data transmission and transmitted according to the second data quality description D(n2') and the second transport format T(k2').

2. The secondary network node of claim 1, the secondary network node further operable to:
   detect an uplink signal from the second wireless device;
   determine a signal quality for the uplink signal; and
   select the second data quality description D(n2') and the second transport format T(k2') based on the signal quality determined for the uplink signal.

3. The secondary network node of claim 1, the secondary network node further operable to:
   transmit a beacon signal;
   receive a channel quality indicator (CQI) indicating a channel quality that the second wireless device associates with the beacon signal; and
   select the second data quality description D(n2') and the second transport format T(k2') based on the CQI.

4. The secondary network node of claim 1, wherein the secondary network node operates in an open loop configuration such that the secondary network node selects the second data quality description D(n2') and the second transport format T(k2') independently of signals received from wireless devices.

5. The secondary network node of claim 1, the secondary network node further operable to send a message to the primary network node indicating that the second wireless device is within coverage of the secondary network node.

6. The secondary network node of claim 1, the secondary network node further operable to:
   select a third data quality description D(n3') and a third transport format T(k3') for a third data transmission, the third data quality description D(n3') different than the second data quality description D(n2') and the third transport format T(k3') different than the second transport format T(k2'); and
   transmit the third data transmission from the secondary network node to a third wireless device, the third data transmission comprising at least a portion of the media content of the first data transmission and transmitted according to the third data quality description D(n3') and the third transport format T(k3').

7. The secondary network node of claim 6, wherein the secondary network node operates in an open loop configuration such that the secondary network node selects the second data quality description D(n2'), the second transport format T(k2'), the third data quality description D(n3'), and the third transport format T(k3') independently of signals received from wireless devices.

8. The secondary network node of claim 1, the secondary network node further operable to:

select a third data quality description D(n3') and a third transport format T(k3') for a third data transmission, the third data quality description D(n3') different than the second data quality description D(n2') and the third transport format T(k3') different than the second transport format T(k2'); and if the third transport format carries fewer information bits per a same time resource than the second transport format, instead of transmitting the second data transmission, simultaneously transmitting the third data transmission from the secondary network node to the second wireless device and to a third wireless device, the third data transmission comprising at least a portion of the media content of the first data transmission and transmitted according to the third data quality description D(n3') and the third transport format T(k3').

9. The secondary network node of claim 1, wherein the second data transmission is separated from signals transmitted by the primary network node according to one or more of frequency, time, and code.

10. The secondary network node of claim 1, the secondary network node further operable to determine that the second wireless device is capable of interference cancellation and, in response, align the timing of the second data transmission relative to signals transmitted by the primary network node.

11. A wireless device, comprising:
one or more processors; and
a non-transitory computer-readable storage medium further including computer-readable instructions that, when executed by the one or more processors, are configured to:
  send a message to a primary network node indicating that the wireless device is within coverage of a secondary network node;
  detect a first data transmission from the primary network node, the first data transmission comprising media content and having a first data quality description D(n2) and a first transport format T(k2);
  detect a second data transmission from the secondary network node, the second data transmission comprising at least a portion of the media content and having a second data quality description D(n2') and a second transport format T(k2'), the second data quality description D(n2') different than the first data quality description D(n2) and the second transport format T(k2') different than the first transport format T(k2); and
  determine the media content based on at least one of the first data transmission and the second data transmission.

12. The wireless device of claim 11, further operable to:
receive a beacon signal from the secondary network node; and
transmit a channel quality indicator (CQI) to the secondary network node, the CQI indicating a channel quality that the wireless device associates with the beacon signal.

13. The wireless device of claim 11, wherein the wireless device determines the media content based on combining the first data transmission and the second data transmission.

14. The wireless device of claim 11, wherein the wireless device is further operable to indicate to at least one of the primary network node and the secondary network node whether wireless device is capable of interference cancellation.

15. The wireless device of claim 11, wherein the wireless device is further operable to determine whether to use signal separation on the uplink based on whether the secondary network node is capable of interference cancellation.

16. A method in a secondary network node, comprising:
detecting a first data transmission from a primary network node to a first wireless device, the first data transmission comprising media content and having a first data quality description D(n1) and a first transport format T(k1);
selecting a second data quality description D(n2') and a second transport format T(k2') for a second data transmission, the second data quality description D(n2') different than the first data quality description D(n1) and the second transport format T(k2') different than the first transport format T(k1); and
transmitting the second data transmission from the secondary network node to a second wireless device, the second data transmission comprising at least a portion of the media content of the first data transmission and transmitted according to the second data quality description D(n2') and the second transport format T(k2').

17. The method claim 16, further comprising:
detecting an uplink signal from the second wireless device;
determining a signal quality for the uplink signal; and
selecting the second data quality description D(n2') and the second transport format T(k2') based on the signal quality determined for the uplink signal.

18. The method of claim 16, further comprising:
transmitting a beacon signal;
receiving a channel quality indicator (CQI) indicating a channel quality that the second wireless device associates with the beacon signal; and
selecting the second data quality description D(n2') and the second transport format T(k2') based on the CQI.

19. The method of claim 16, wherein the method uses an open loop configuration such that the method selects the second data quality description D(n2') and the second transport format T(k2') independently of signals received from wireless devices.

20. The method of claim 16, further comprising sending a message to the primary network node indicating that the second wireless device is within coverage of the secondary network node.

21. The method of claim 16, further comprising:
selecting a third data quality description D(n3') and a third transport format T(k3') for a third data transmission, the third data quality description D(n3') different than the second data quality description D(n2') and the third transport format T(k3') different than the second transport format T(k2'); and
transmitting the third data transmission from the secondary network node to a third wireless device, the third data transmission comprising at least a portion of the media content of the first data transmission and transmitted according to the third data quality description D(n3') and the third transport format T(k3').

22. The method of claim 21, wherein the method uses an open loop configuration such that the method selects the second data quality description D(n2'), the second transport format T(k2'), the third data quality description D(n3'), and the third transport format T(k3') independently of signals received from wireless devices.

23. The method of claim 16, further comprising:
selecting a third data quality description D(n3') and a third transport format T(k3') for a third data transmission, the third data quality description D(n3') different than the second data quality description D(n2') and the third transport format T(k3') different than the second transport format T(k2'); and if the third transport format carries fewer information bits per a same time resource than the second transport format, instead of transmitting the second data transmission, simultaneously transmitting the third data transmission from the secondary network node to the second wireless device and to a third wireless device, the third data transmission comprising at least a portion of the media content of the first data transmission and transmitted according to the third data quality description D(n3') and the third transport format T(k3').

24. The method of claim 16, wherein the second data transmission is separated from signals transmitted by the primary network node according to one or more of frequency, time, and code.

25. The method of claim 16, further comprising determining that the second wireless device is capable of interference cancellation and, in response, aligning the timing of the second data transmission relative to signals transmitted by the primary network node.

\* \* \* \* \*